(12) United States Patent
Vernica et al.

(10) Patent No.: US 11,295,681 B2
(45) Date of Patent: Apr. 5, 2022

(54) DISPLAY DEVICE

(71) Applicant: Hewlett-Packard Development Company, L.P., Spring, TX (US)

(72) Inventors: Rares Vernica, Palo Alto, CA (US); Mark Huber, Palo Alto, CA (US); Omer Gila, Palo Alto, CA (US); Napoleon Leoni, Palo Alto, CA (US); Steven J. Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,942

(22) PCT Filed: Jan. 22, 2018

(86) PCT No.: PCT/US2018/014672
§ 371 (c)(1),
(2) Date: May 1, 2020

(87) PCT Pub. No.: WO2019/143369
PCT Pub. Date: Jul. 25, 2019

(65) Prior Publication Data
US 2020/0357349 A1 Nov. 12, 2020

(51) Int. Cl.
*G06K 19/06* (2006.01)
*G09G 3/34* (2006.01)
*B41J 3/407* (2006.01)

(52) U.S. Cl.
CPC .......... *G09G 3/3453* (2013.01); *B41J 3/4076* (2013.01); *G06K 19/06028* (2013.01); *G09G 2300/06* (2013.01)

(58) Field of Classification Search
CPC ............ B41J 3/4076; G06K 19/06028; G09G 3/3453; G09G 2300/06
See application file for complete search history.

(56) References Cited

U.S. PATENT DOCUMENTS

| | | | |
|---|---|---|---|
| 5,155,813 A * | 10/1992 | Donoghue | G06F 3/04845 345/179 |
| 6,337,698 B1 * | 1/2002 | Keely, Jr. | G06F 3/0483 715/777 |
| 6,340,965 B1 | 1/2002 | Howard et al. | |
| 7,429,965 B2 | 9/2008 | Weiner | |
| 7,791,489 B2 | 9/2010 | Gelbman et al. | |
| 8,054,218 B2 | 11/2011 | Gelbman | |
| 10,613,748 B2 * | 4/2020 | Alcorn | G06F 16/24578 |
| 2003/0214531 A1 * | 11/2003 | Chambers | G06F 40/171 715/764 |
| 2010/0171754 A1 * | 7/2010 | Hatfield | G06K 9/00416 345/619 |
| 2010/0321480 A1 | 12/2010 | Berman et al. | |

(Continued)

FOREIGN PATENT DOCUMENTS

| WO | WO-9938117 | 7/1999 |
|---|---|---|
| WO | WO-2017047396 A1 | 5/2017 |
| WO | WO-2017074340 A1 | 5/2017 |

*Primary Examiner* — Mihir K Rayan
(74) *Attorney, Agent, or Firm* — Dicke Billig & Czaja PLLC

(57) ABSTRACT

A display device includes a non e-paper portion to display a first pattern element and a passive e-paper display portion to display a second pattern element juxtaposed relative to the first pattern element.

10 Claims, 10 Drawing Sheets

(56) References Cited

U.S. PATENT DOCUMENTS

| | | | |
|---|---|---|---|
| 2012/0206341 A1* | 8/2012 | Gila | G06K 19/07707 |
| | | | 345/156 |
| 2013/0056539 A1 | 3/2013 | Iwaloye | |
| 2016/0342063 A1* | 11/2016 | Gila | B42D 25/26 |
| 2016/0342064 A1* | 11/2016 | Gila | G09G 3/344 |
| 2016/0349591 A1* | 12/2016 | Birecki | G09F 9/372 |
| 2017/0083232 A1* | 3/2017 | Helmes | G06F 3/04886 |
| 2017/0300674 A1 | 10/2017 | Simske et al. | |
| 2017/0317830 A1 | 11/2017 | Simske et al. | |
| 2017/0361624 A1 | 12/2017 | Gila et al. | |

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper may be implemented as a flexible, thin sheet, like paper. One familiar e-paper implementation includes e-readers.

DETAILED DESCRIPTION

Figure 1:
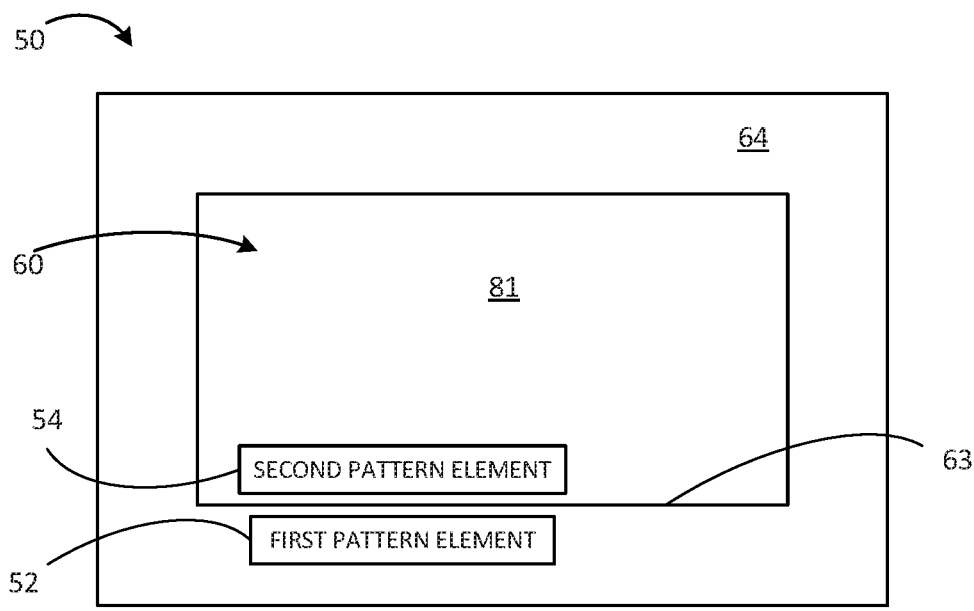
FIG. 1 is a top plan view schematically representing an example display device including a first and second pattern element.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to a display device including a non-imagable support frame within which is supported a passive e-paper display portion. An imaging unit may selectively write a second pattern element within the passive e-paper display portion to be juxtaposed relative to a first pattern element on the non-imagable support frame. Via such juxtaposition, the display device may communicate various types of information to a user or other audience (e.g. clerk, security guard, employer, teacher, etc.).

In some examples, a display device comprises a non e-paper portion to display a first pattern element and a passive e-paper display portion surrounded by the non-e-paper portion to display an externally written second pattern element juxtaposed relative to the first pattern element.

In some instances, the non e-paper portion may sometimes be referred to as a non-imagable support frame. In this context, it will be understood that the term "non-imagable" refers to the support frame being non-imagable by an e-paper imaging unit which may cause formation images on the passive e-paper display portion.

In some examples, the second pattern element and/or other images may be written onto the passive e-paper display portion of the display device. In some examples, the imaging device comprises an erasing unit, a writing unit, and a control portion. The erasing unit is to erase a passive e-paper display portion of a display device. The writing unit is to write, via airborne charges, a second pattern element in/on the passive e-paper display portion to be juxtaposed relative to a first pattern element on a non-imagable support frame surrounding the passive e-paper display portion. The control portion comprises a processor and a non-transitory memory to store instructions, executable via the processor, to cause selective writing of the second pattern element in the juxtaposed position according to a selectable size, shape, location, and orientation on the passive e-paper display portion.

In some examples, the juxtaposition of the respective first and second pattern elements may comprise the second pattern element having a complementary relation to the first pattern element.

Via such arrangements, the first pattern element on the non-imagable support frame provides a static feature or context relative to which a second pattern element may be written to provide a dynamic feature on the display device. The juxtaposition of the re-writable second pattern element relative to the first pattern element conveys dynamic forms of information, which may be used for marketing, security, access, identification, gifts, awards, transactions, etc.

These examples, and additional examples, are described in association with at least FIGS. 1-16.

FIG. 1 is a block diagram schematically representing an example display device 50. As shown in FIG. 1, display device 50 comprises a passive e-paper display portion 60 surrounded by a non-imagable support frame 64, which also may sometimes be referred to as a non-e-paper portion 64. A first pattern element 52 is present on the non-imagable support frame 64 and a second pattern element 54 forms part of, or an entire image, on the passive e-paper display portion 60. The second pattern element 54 is juxtaposed relative to the first pattern element 52 across a border 63 between the passive e-paper display portion 60 and the non-imagable support frame 64. In one aspect, the border 63 is defined by an inner edge of the non-imagable support frame 64 which defines an aperture (i.e. window) through which the passive e-paper display portion 60 may be accessed and/or viewed. Further details regarding the construction of the example display device 50 are provided later in association with at least FIG. 12.

Based on the content of the respective first and second pattern elements and/or based on the manner in which the first and second pattern elements are juxtaposed relative to each other, the combination of the first and second pattern elements (or absence of the second pattern element) convey information to a user. More specific examples of such arrangement are described below throughout the present disclosure.

Figure 2:
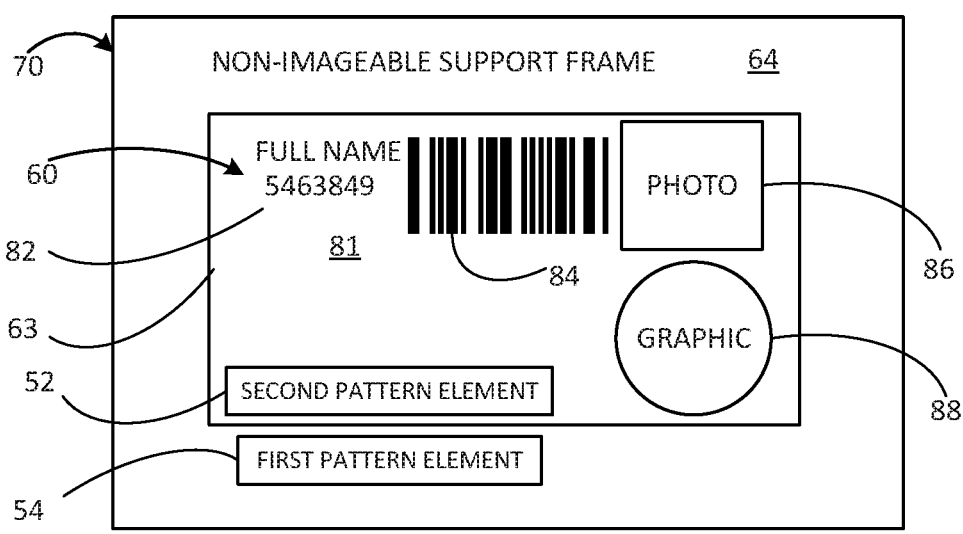
FIG. 2 is a top plan view schematically representing an example display device including a first and second pattern element along with additional elements in a passive e-paper display portion.

FIG. 2 is a block diagram schematically representing an example display device 70 in which some example forms of information can form part of an image 81 on an e-paper display portion 60. In some examples, the display device 70 comprises at least some of substantially the same features and attributes as display device 50, as previously described in association with at least FIG. 1. As in FIG. 1, image 81 on e-paper display portion 60 may comprise a second pattern element 54, which may be juxtaposed relative to first pattern element 52. In some examples, image 81 may include other information in addition to and/or instead of the second pattern element 54. For instance, image 81 may comprise text 82, such as alphanumeric expressions like names, numbers, etc. In some instances, image 81 may comprise machine readable markings 84, such as a bar code or QR code. In some examples, the machine readable markings 84 may store information such as but not limited to access information.

In some instances, image 81 may comprise a photo 86 and/or a graphic 88. In some such examples, the photo 86 may correspond to a photo of a person or an authentication object (e.g. trees, mountains, animal, etc.) when display device 70 is used for identification, access, etc.

In some examples, other than second pattern element 54, any of the various above-described types of information in image 81 may permanently form part of non-imagable support frame 64 instead of, or in addition to, being part of image 81 on e-paper display portion 64.

Figure 3:
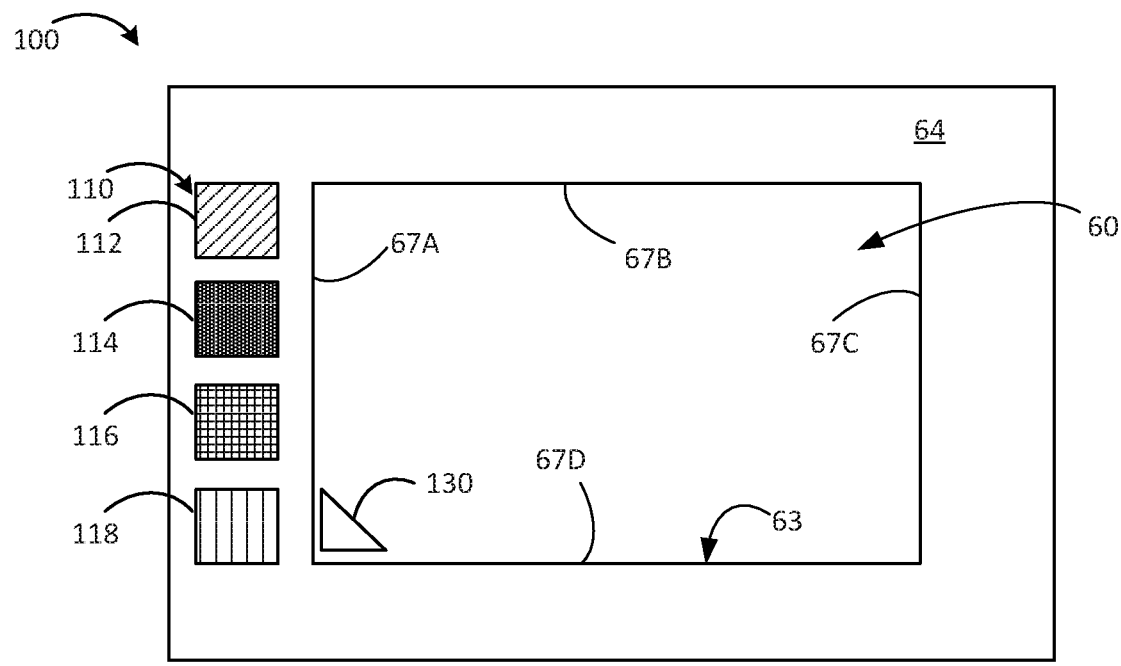
FIGS. 3-4 are each a top plan view schematically representing an example display device including a plurality of first pattern elements and a second pattern element.

FIG. 3 is a diagram schematically representing an example display device. In some examples, the display device 100 comprises at least some of substantially the same features and attributes as display devices 50, 70, as previously described in association with at least FIGS. 1-2. As shown in FIG. 3, in some examples, a plurality 110 of different first pattern elements 112, 114, 116, 118 are arranged in a row along the border 63 of the non-imagable support frame 64 and of the passive e-paper display portion 60. In some such examples, the row of first pattern elements is arranged along one edge 67A of the rectangular-shaped border 63 as shown in FIG. 3. However, in some examples the plurality of first pattern elements 112, 114, 116, 118 are arranged along at least two different edges (e.g. 67A, 67B) of all edges (e.g. 67A, 67B, 67C, 67D) of border 63. While FIG. 3 depicts a rectangular shaped border, it will be understood that border 63 may exhibit another shape, e.g. circular, elliptical, triangular, trapezoidal, etc.

In some examples, at least some of the respective different first pattern elements may comprise a different color from each other. In some such examples, each respective different first pattern element comprises a different color. As shown in FIG. 3, for illustrative purposes each different color is represented via different type of black-and-white shading. Moreover, as shown in FIG. 3, in some examples the respective different first pattern elements 112, 114, 116, 118 comprise the same shape and same size. In some examples, at least some of the respective different first pattern elements 112, 114, 116, 118 may comprise at least some different shapes and/or at least some different sizes.

In some examples, each different first pattern element comprises a different shape with each different shape conveying at least one of a different activity, different identity, different geographic location, etc.

In some examples, the second pattern element 130 may be imaged as at least one of a black-and-white pattern, a color pattern, and a greyscale pattern. The second pattern element 130 may comprise the same shape or a different shape from the first pattern elements 112, 114, 116, 118.

By juxtaposing the dynamic second pattern element 130 relative to one of the different first pattern elements 112, 114, 116, 118, in some examples the display device 100 may communicate some information associated with and represented via one of the respective first pattern elements 112, 114, 116, 118.

Figure 4:
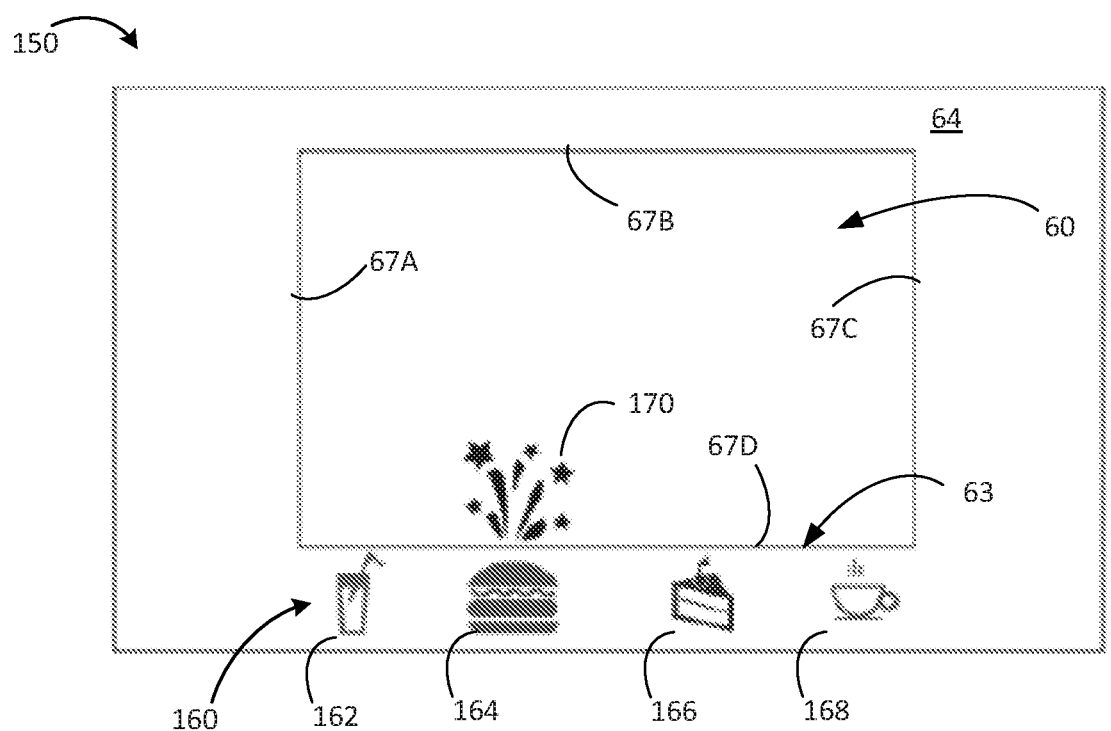

FIG. 4 is a diagram schematically representing an example display device 150. In some examples, the display device 150 comprises at least some of substantially the same features and attributes as at least display device 100, as previously described in association with at least FIG. 3, except with the plurality of 160 of first pattern elements 162, 164, 166, 168 on support frame 64 with each comprising a different logo or symbol (e.g. beverage, sandwich, cake, coffee cup respectively) along a bottom edge 67D of border 63.

Meanwhile, in some examples the second pattern element 170 comprises a symbol different from the symbols of the first pattern elements 162, 164, 166, 168. In some examples, when juxtaposed relative to one of the respective first pattern elements, the second pattern element 170 may indicate a reward, gift, redemption value, etc. associated with the particular first pattern element 162, 164, 166, 168 (or multiple first pattern elements) to which the second pattern element 170 is juxtaposed. For instance, when the display device 150 is used as a reward card such as in association with a transaction, a clerk may submit the reward card to an imaging unit (e.g. 510 in FIG. 11) which then randomly selects and writes the second pattern element 170 to be juxtaposed relative to one of the first pattern elements 162, 164, 166, 168 on the non-imagable support frame 64 to thereby indicate to the user and the clerk a reward (e.g. coffee, sandwich, etc.) won by the cardholder.

In at least the illustrated example, the same symbol is used for second pattern element 170 regardless to which first pattern element 162, 164, 166, 168 the second pattern element 170 is juxtaposed. However, it will be understood that in some examples, different second pattern elements 170 may be used.

Figure 5:
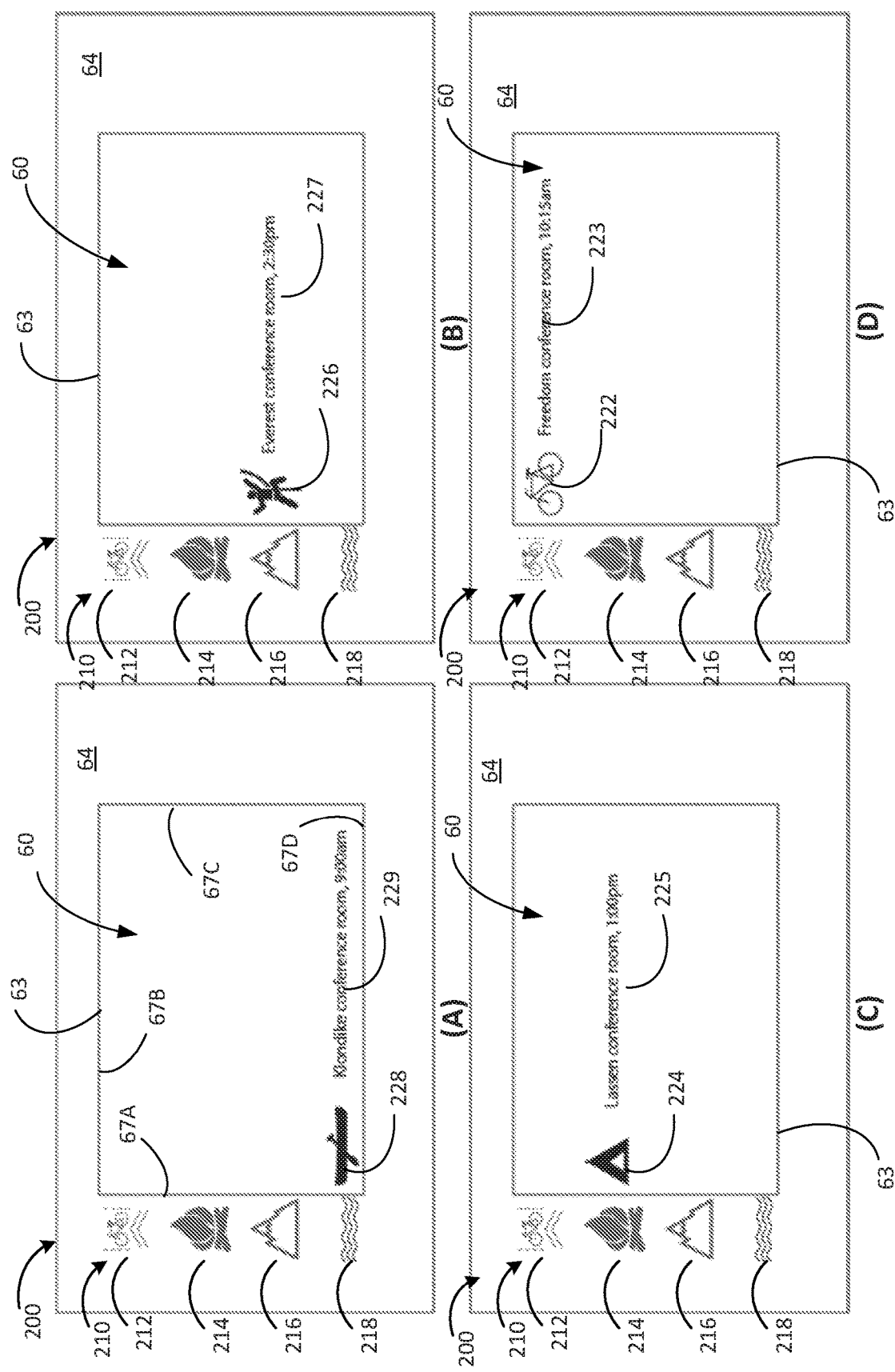
FIG. 5 includes several frames each of which is a top plan view schematically representing an example display device including a plurality of first pattern elements and different example second pattern elements.

FIG. 5 is a diagram including a series of frames which schematically represent an example display device 200. In some examples, the display device 200 comprises at least some of substantially the same features and attributes as at least display devices 50, 100, 150 as previously described in association with at least FIGS. 1-4. Like the arrangement in display device 150, each first pattern element 212, 214, 216, 218 comprises a different logo or symbol (e.g. bicycle path, campfire, mountain silhouette, waves/water, respectively) along an edge (e.g. 67A) of border 63. In some such examples, each symbol relates to a single theme such as outdoor recreational activities.

Meanwhile, as shown in each of the respective frames A, B, C, D of FIG. 5, in some examples there are four different second pattern elements (e.g. see canoe logo 228 in FIG. 5(A), climber logo 226 in FIG. 5(B), tent logo 224 in FIG. 5(C), and bicycle logo 222 in FIG. 5(D)) each of which exhibits a theme-based relationship to the first pattern element to which the particular second pattern element may be juxtaposed.

In some such examples, appearance of the second pattern element (e.g. 222, 224, 226, 228) on the display device juxtaposed to the first pattern element (e.g. 212, 214, 216, 218) can be used to signify permission to enter, authorization to participate, etc. On the other hand, the absence of any second pattern element (e.g. 222, 224, 226, 228) at all or the absence of the correct second pattern element next to the appropriate first pattern element may be used to indicate lack of permission to enter, lack of authorization to participate, etc.

In some examples, along with the particular logo (e.g. 222, 224, 226, 228 in FIG. 5), the second pattern element may include a text component (e.g. 223, 225, 227, 229 in FIG. 5(A)) designating additional information, such as a location (e.g. particular conference room, building, etc.) and/or temporal information (e.g. time-of-day, day of week, etc.).

Accordingly, as shown in the example in FIG. 5, in some examples, all of the first pattern elements 212, 214, 216, 218 are associated with a single theme (e.g. outdoor recreation) and the second pattern elements 222, 224, 226, 228 having a complementary meaning relative to the single theme (e.g., camping, swimming, etc.) However, in some examples, such complementary meaning may be implemented via use of more than one theme.

In some examples, there can be a greater number or a fewer number of different second pattern elements than a number of first pattern elements.

Figure 6A:
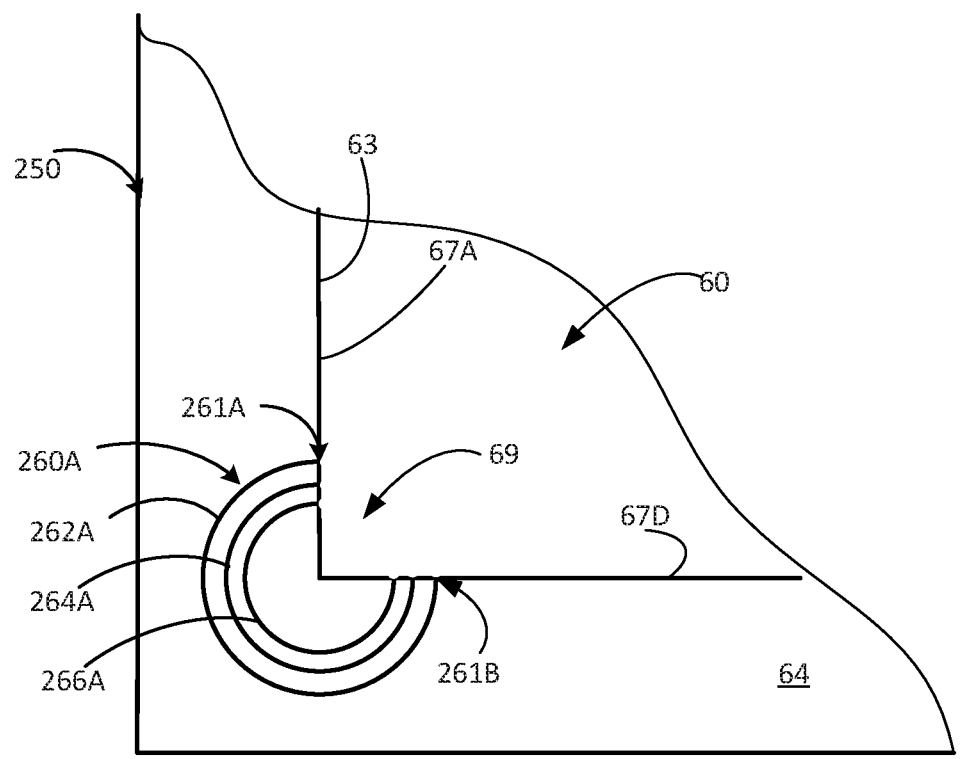
FIGS. 6A-6D are each a partial top plan view schematically representing a portion of an example display device including a first pattern element and different example second pattern elements.

FIG. 6A is a diagram including a partial top plan view schematically representing an example display device 250. In some examples, the display device 250 comprises at least some of substantially the same features and attributes as at least display devices 50, 100, 150, 200 as previously described in association with at least FIGS. 1-5. As shown in FIG. 6A, display device 250 comprises a first pattern element 260A at a corner 69 of border 63 (of non-imagable support frame 64 and e-paper display portion 60). Opposite ends 261A, 261B of the first pattern element 260A abut respective edges 67A, 67D of border 63. Meanwhile, the passive e-paper display portion 60 omits a second pattern element in corner 69, thereby causing first pattern element 260A to appear as an "open" shape or symbol.

In some examples, the first pattern element 260A comprises a plurality of concentric rings 262A, 264A, 266A.

Figure 6B:
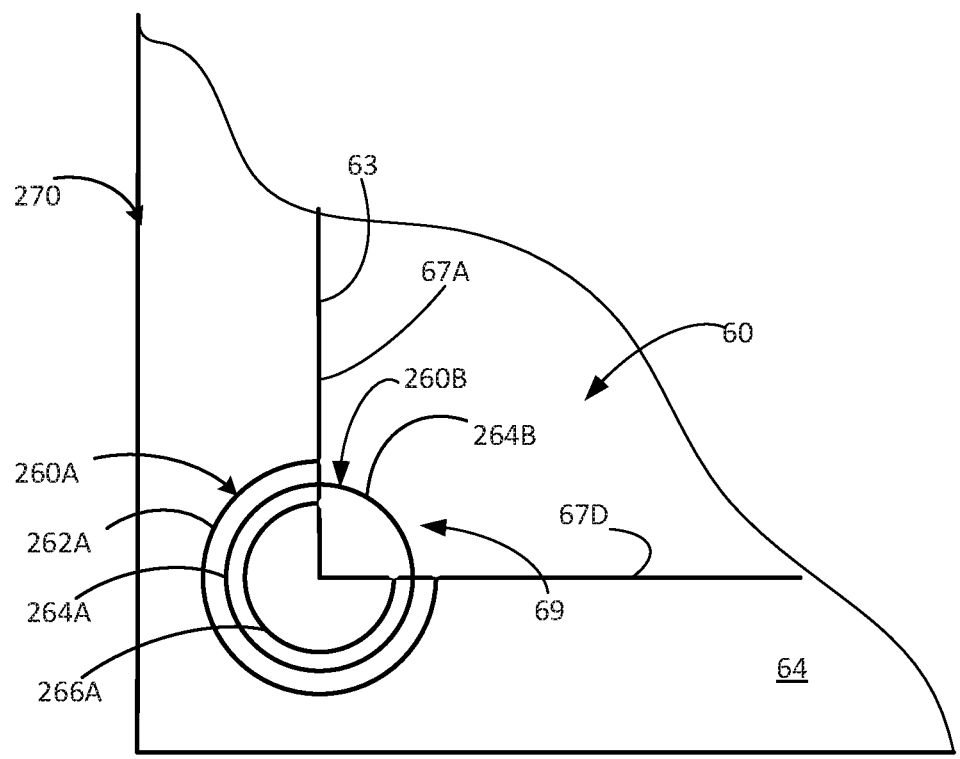
Figure 6C:
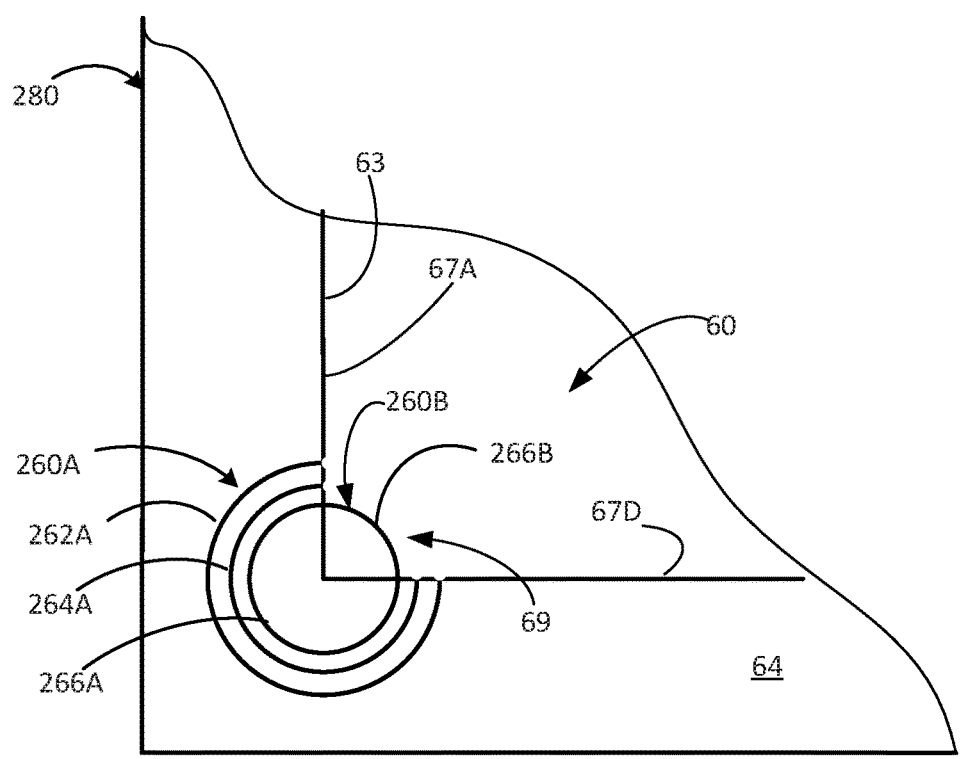
Figure 6D:
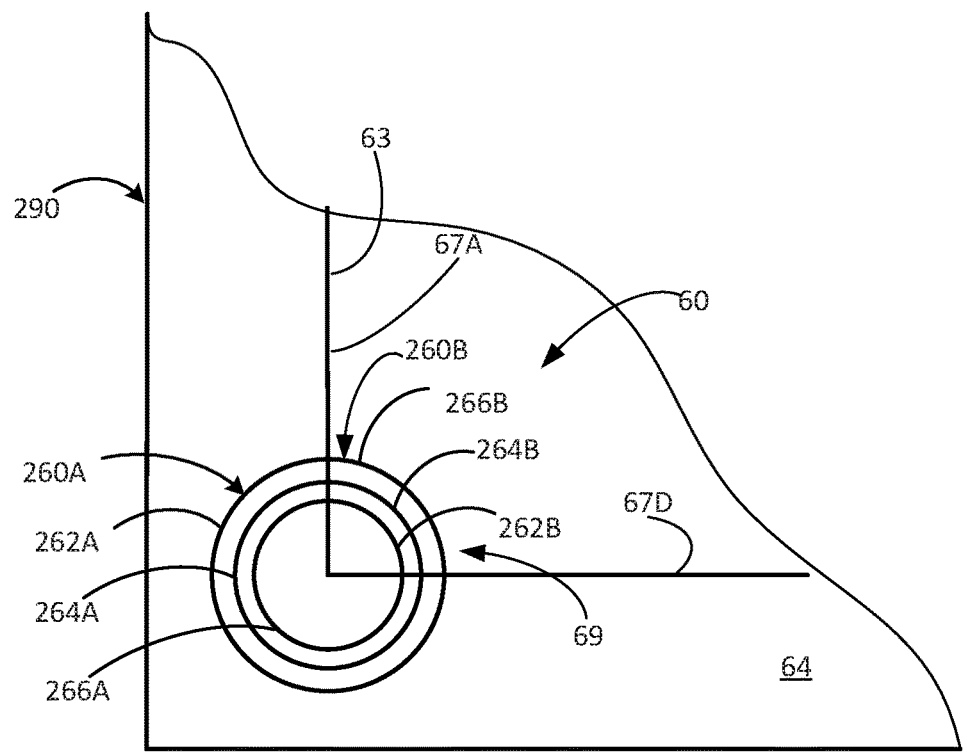

Via this arrangement in FIG. 6A, at least one expression of information (e.g. access or security information) is conveyed via display device 270 independently and/or in comparison to display devices 270 (FIG. 6B), 280 (FIG. 6C), and 290 (FIG. 6D).

As shown in FIG. 6B, in some examples a second pattern element 260B has been written in passive e-paper display portion 60 (e.g. in corner 69) of a display device 270 with the second pattern element 260B comprising a single ring portion 264B which is sized and shaped such that opposite ends of the ring portion 264B contiguously abut the opposite ends of ring portion 264A of the first pattern element at edge 67A, 67D of border 63 such that a combination of the respective ring portions 264A, 264B defines a complete ring straddling the non-imagable support frame 64 and the passive e-paper display portion 60. Via this arrangement, one expression of information (e.g. access or security information) is conveyed via display device 270 independently and/or in comparison to display devices 250 (FIG. 6A), 280 (FIG. 6C), and 290 (FIG. 6D).

At least because a general audience would be unaware of a particular security feature which is valid within a particular time frame, they would not be able to discern in advance which particular pattern of ring portions comprising a second pattern element on passive e-paper display portion 60 provides completion of a valid feature in passive e-paper display portion 60 within the particular time frame. As further shown below, the addition of more ring portions and/or absence of some ring portions (as second pattern element) in FIGS. 6C-6D enables numerous permutations of the dynamic feature in the passive e-paper display portion 60. Of course, when providing the non-imagable support frame 64, a greater or fewer number of ring portions may be used than the 3 rings shown for the static first pattern element in FIGS. 6A-6D. Moreover, shapes other than rings may be used in a similar manner. Furthermore, portions of border 63 other than a corner 69 may be used to implement such dynamic features.

In some examples, the combination of the static first pattern element 260A and the dynamic second pattern element 260B (e.g. FIGS. 6A-6D) may be used for security purposes to communicate whether the display device (e.g. 250, 270, 280 290) is authentic (e.g. the display device has not been tampered with), whether the holder is authorized to enter, etc.

FIG. 6C schematically represents another display device 280 like display device 270 in FIG. 6B, except with second pattern element 260B comprising an inner ring portion 266B having opposite ends of the ring portion 266B contiguously abutting the opposite ends of ring portion 266A of the first pattern element at edges 67A, 67D of border 63. A combination of the respective ring portions 266A, 266B define a complete ring straddling the non-imagable support frame 64 and the passive e-paper display portion 60. Via this arrangement, a different expression of information (e.g. access or security information) is conveyed via display device 280 independently and/or in comparison to display devices 250, 270, or 290 (FIG. 6D).

FIG. 6D schematically represents another display device 290 like display device 270 in FIG. 6C, except with second pattern element 260B comprising three concentric ring portions 262B, 264B, 266B having opposite ends abutting the opposite ends of the respective ring portions 262A, 264A, 266A of the first pattern element 260A at edges 67A, 67D of border 63. A combination of the respective ring portions (e.g. 262A and 262B, 264A and 264B, and 266A and 266B) define a group of complete concentric rings straddling the non-imagable support frame 64 and the passive e-paper display portion 60. Via this arrangement, a different expression of information (e.g. access or security information) is conveyed via display device 290 independently and/or in comparison to display devices 250, 270 or 280.

As may be observed in at least FIG. 6D, the arrangement of concentric rings (formed by the combination of first and second pattern elements) provides multiple points of abutting congruity between first pattern element 260A and second pattern element 260B, with such multiple points spaced apart along edges 67A, 67D of border 63.

In some examples, a second pattern element may be implemented as a security feature via other shapes/patterns, such as via a bar code, QR code, etc. as shown below in association with at least FIG. 7A.

Figure 7A:
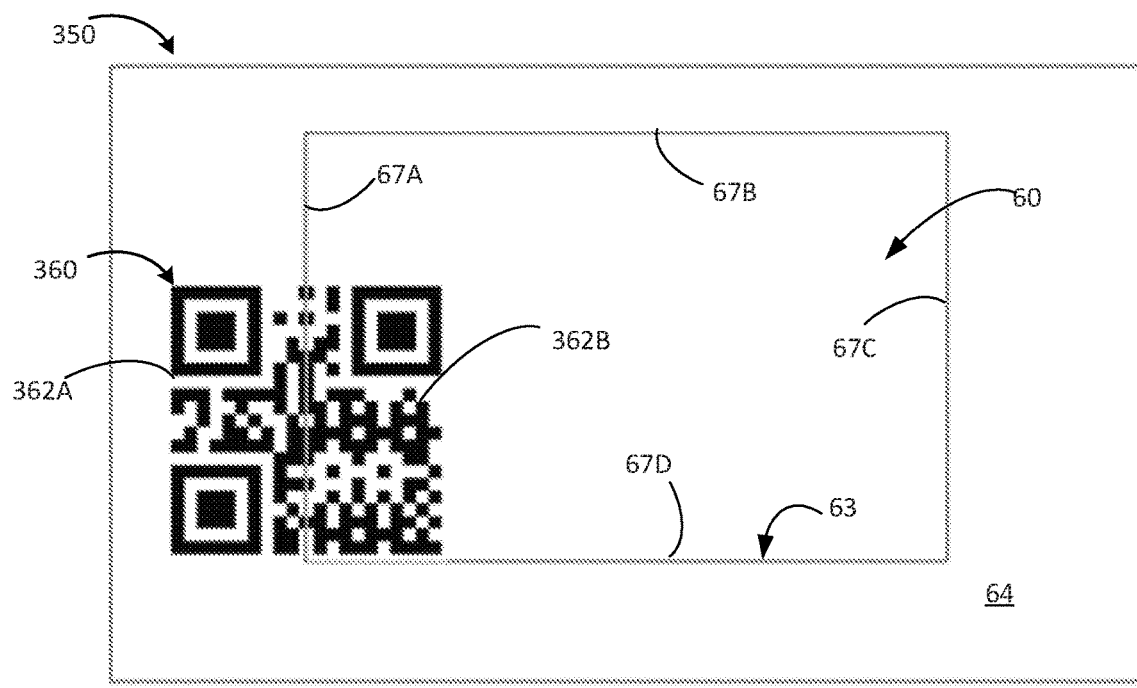
FIG. 7A is a top plan view schematically representing an example display device including a combination of a first pattern element and a second pattern element forming a machine readable code.

FIG. 7A is a diagram including a top plan view schematically representing an example display device 350. In some examples, the display device 350 comprises at least some of substantially the same features and attributes as the display devices, as previously described in association with at least FIGS. 1-6. In some examples, a first pattern element 362A on non-imagable support frame 64 comprises a first portion of a machine readable code 360 and a second pattern element 362B in the passive e-paper display portion 60 acts as a complementary second portion of the machine readable code 360 such that a combination of the first and second pattern elements 362A, 362B forms a complete machine readable code. In some examples, the machine readable code 360 comprises a two dimensional code (e.g. QR code) or a single dimensional bar code, etc.

Via this arrangement, as may be observed in at least FIG. 7A, the configuration of the machine readable code (formed by the combination of first and second pattern elements 362A, 362B) provides multiple points of abutting congruity between first pattern element 362A and second pattern element 362B, with such multiple points spaced apart alongside edge 67A of border 63.

In some examples, the dynamic second pattern element 362B may be used as a security feature in a manner at least similar to that described above in association with at least FIGS. 6A-6D and/or some later described examples.

Figure 7B:
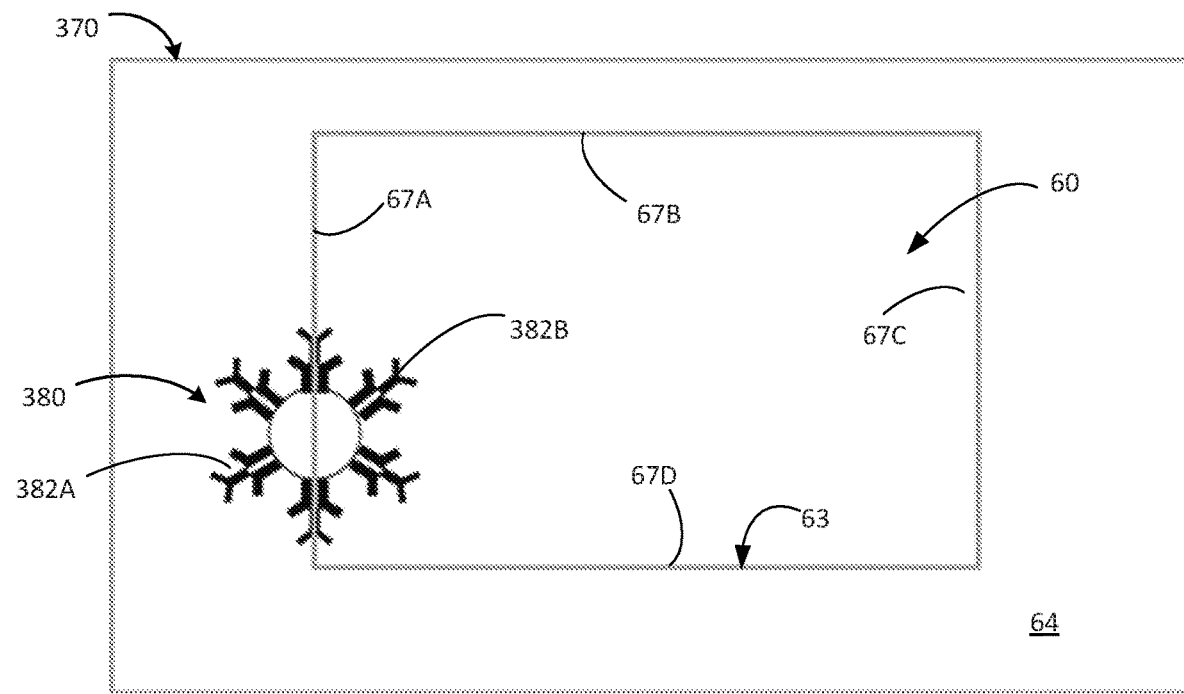
FIG. 7B is a top plan view schematically representing an example display device including a combination of a first pattern element and a second pattern element forming a complex shape.

FIG. 7B is a diagram including a top plan view schematically representing an example display device 370. In some examples, the display device 370 comprises at least some of substantially the same features and attributes as at least display devices 350, as previously described in association with at least FIG. 7A, except with a snowflake-like shape 380 in FIG. 7B instead of a machine readable code as in FIG. 7A. As shown in FIG. 7B, in some examples a first pattern element 382A on non-imagable support frame 64 comprises a first portion of a complex shape and a second pattern element 382B in the passive e-paper display portion 60 acts as a complementary second portion of the complex shape such that a combination of the first and second pattern elements 382A, 382B forms a complete complex shape 380, such as a snowflake.

Via this arrangement, as may be observed in at least FIG. 7B, the configuration of the complex shape 380 (formed by the combination of first and second pattern elements 382A, 382B) provides multiple points of abutting congruity between first pattern element 382A and second pattern element 382B.

As shown in FIG. 7B, in some examples the complete complex shaped 380 exhibits symmetry about border 63. In some examples, variations in a size, shape, complexity, etc. of the second portion of the complex shape (e.g. snowflake) as second pattern element 382B may provide a security feature.

Figures 8A, 8B, 8C, 8D:
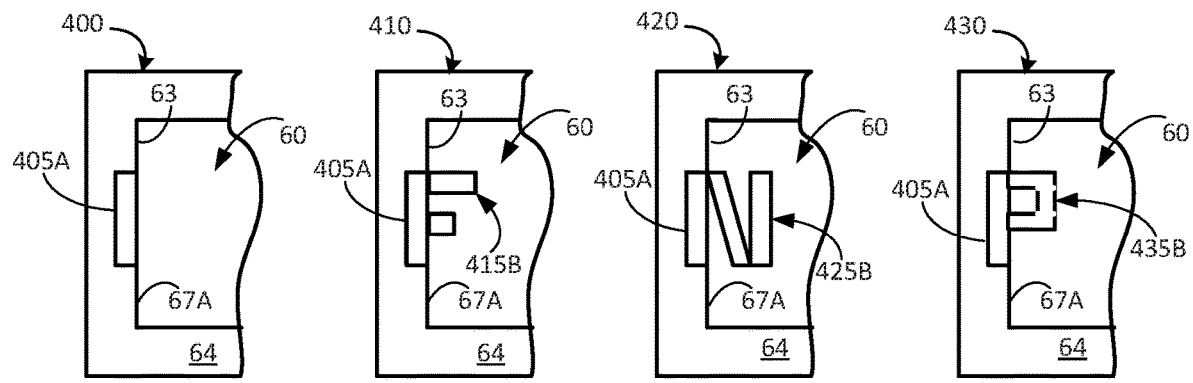
FIGS. 8A-8D are each a partial top plan view schematically representing a portion of an example display device including a first pattern element and different example second pattern elements to form alphanumeric indicators.

FIGS. 8A-8D are each a partial top plan view schematically representing an example display device 410, 410, 420, 430, respectively. In particular, the first pattern element 405A abutting the border as shown in FIG. 8A comprises a first portion. Meanwhile, via imager unit (e.g. 510 in FIG. 11), a second portion (e.g. 415B in FIG. 8B) of a plurality of different second portions (e.g. 415B in FIG. 8B, 425B in FIG. 8C, 435B in FIG. 8D) may be selectively written in the passive e-paper display portion 60 in which each respective different second portion (e.g. 415B, 425B, 435B) is in complementary relation to the same first portion (e.g. 405A). A combination of the first portion (e.g. 405A) with each respective different second portion (e.g. 415B, 425B, 435B) produces a different completed alphanumeric character, such as F, N, and P as shown in FIGS. 8B, 8C, and 8D, respectively.

In the examples shown in FIGS. 8B-8D, the second pattern element (e.g. 415B, 425B, 435B) contiguously abuts the first pattern element (e.g. 405A). However, it will be understood that in some examples, the second pattern element (e.g. 415B, 425B, 435B) may provide a complementary meaning and/or complementary pattern relative to first pattern element (e.g. 405A) even if the second pattern element does not contiguously abut the first pattern element. Stated differently, in at least some examples, providing a small gap between the first pattern element and the second pattern element does not negate the complementary meaning and/or general pattern achieved via juxtaposing the second pattern element relative to the first pattern element in the manner schematically represented via FIGS. 8B-8D.

Figure 9:
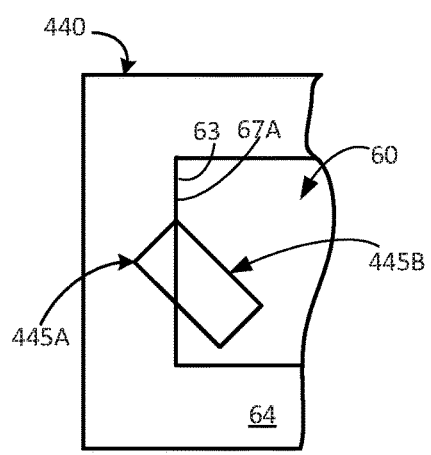
FIG. 9 is a partial top plan view schematically representing a portion of an example display device including a combination of a first pattern element and a second pattern element forming a complete simple shape.

FIG. 9 is a partial top plan view schematically representing an example display device 440. In some examples, the display device 440 comprises at least some of substantially the same features and attributes as at least display devices 400-430 as described in association with at least FIGS. 8A-8D. However, among other differences, instead of the first and second pattern elements forming an alphanumeric character, the first pattern element 445A and the second pattern element 445B form a completed shape, such as a rectangle as shown in FIG. 9. In some examples, the completed shape exhibits symmetry about border 63 while in some examples the completed shape exhibits asymmetry relative to border 63, such as shown in FIG. 9.

Figure 10:
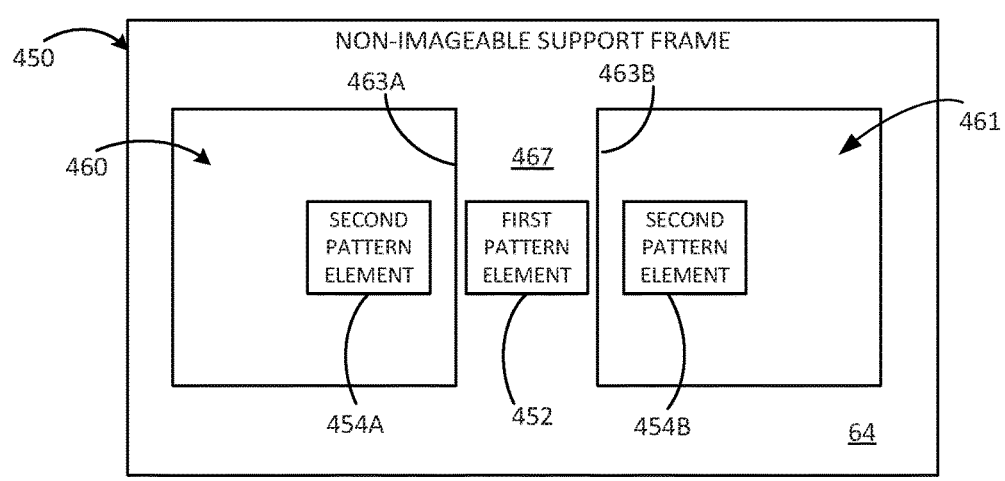
FIG. 10 is a top plan view schematically representing an example display device including a first pattern element and a pair of passive e-paper display portions each including a second pattern element.

FIG. 10 is a top plan view schematically representing an example display device 450. In some examples, display device 450 comprises at least some of substantially the same features and attributes as the display devices in the examples of the present disclosure as previously described in association with at least FIGS. 1-9, except having at least two passive e-paper display portions 460, 461 in which separate second pattern elements 454A, 454B may be written (e.g. via imaging unit 510 in FIG. 11). Via this arrangement, the first pattern element 452 is provided on an inner portion 467 of non-imagable support frame 64 which is interposed between the two e-paper display portions 460, 461 such that first pattern element 452 is sandwiched between the two separate second pattern elements 454A, 454B located on opposite sides of the first pattern element 452. In some examples, one or both of the second pattern elements 454A, 454B may comprise at least some of substantially the same features and attributes as the second pattern elements as previously described in association with at least FIGS. 1-9 and/or as later described in association with at least FIGS. 11-17. In some examples, the two second pattern elements 454A, 454B may be identical to each other in size, shape, etc. while in some examples, at least one feature (e.g. size, shape, meaning, etc.) of one second pattern element (e.g.

454A or 454B) may be different than at least one feature of the other respective second pattern element (e.g. 454A or 454B).

In some examples, the arrangement of two separate passive e-paper display portions 460, 461 on opposite sides of an inner portion 467 of the non-imagable support frame 64 enables the use of two separate second pattern elements 454A, 454B, which may provide for higher levels of communication, security, complexity of information, etc. when the two separate second pattern elements 454A, 454B are used in a coordinated manner relative to the first pattern element 452 and/or relative to each other.

Figure 11:
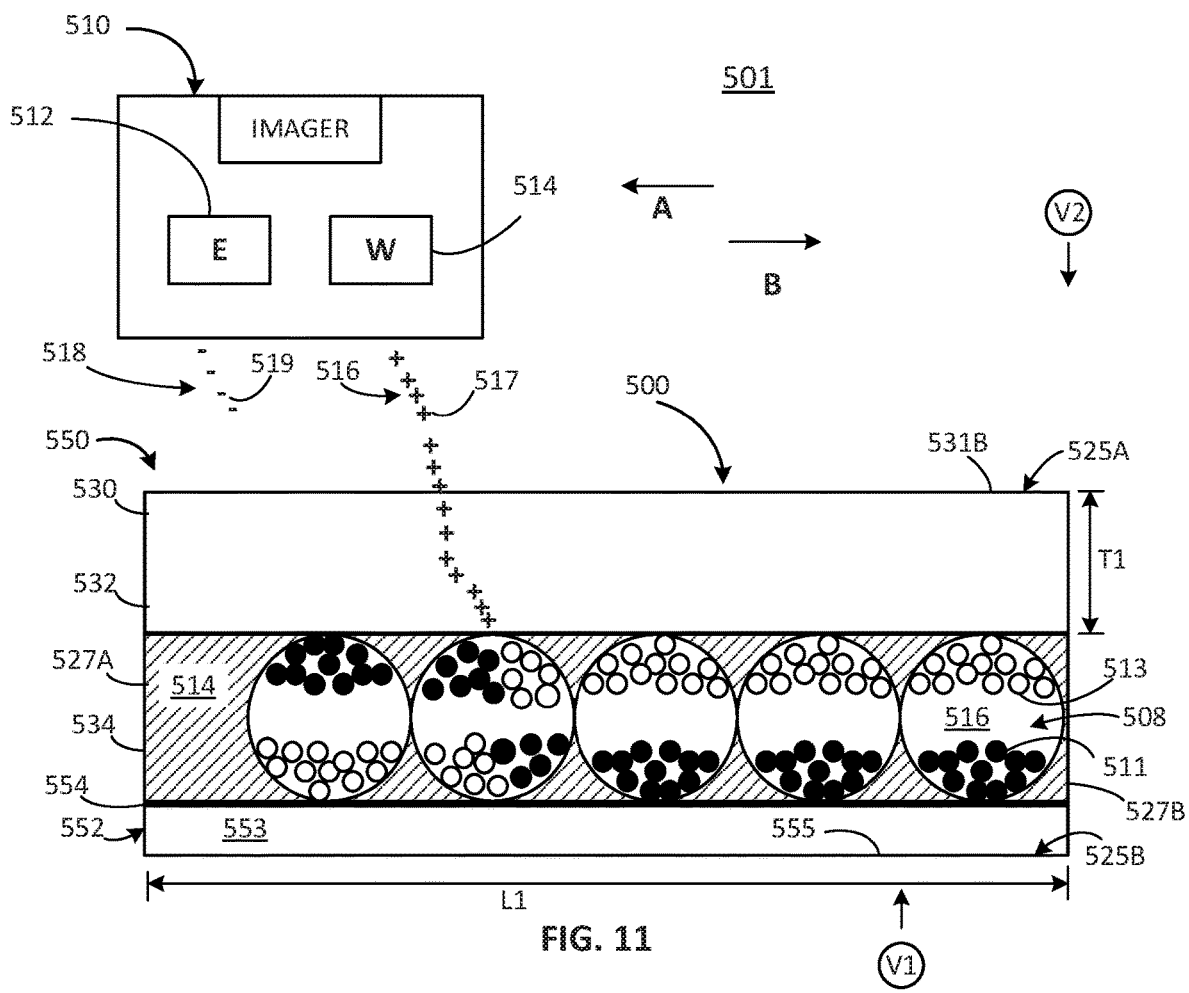
FIG. 11 is diagram including a block diagram and side view to schematically representing an example imager in non-contact relation with an example passive e-paper media.

FIG. 11 is diagram 501 including a cross-sectional view schematically representing one example e-paper assembly 500 and a side plan view schematically representing an example imager unit 510. In some examples, the passive e-paper assembly 500 comprises one example implementation of the example display devices of FIGS. 1-10.

As shown in FIG. 11, e-paper assembly 500 comprises an airborne-charge receiving layer 530, charge-responsive media layer 534, and counter electrode layer 552.

In some examples, the external surface 555 of counter electrode layer 552 comprises a viewing side 525B of the e-paper assembly 500 as represented by the directional arrow V1. Meanwhile, external surface 531B of airborne-charge receiving layer 530 provides the surface at which charges are applied (e.g. an imaging surface) for e-paper assembly 500.

As shown in FIG. 11, in some examples the charge-responsive media layer 534 includes microcapsules 508 encapsulated by a resin or polymer 514. In one example, each microcapsule 508 includes black particles 511 and white particles 513 suspended in a fluid medium 516.

In some examples, when held in a viewing position, ambient light is transmitted through a transparent (or translucent) counter electrode layer 552, strikes microcapsules 508, and is reflected back to the viewer V1. In instances in which white particles 513 of a microcapsule 508 are located near counter electrode layer 552, the respective microcapsule 508 appears white to a viewer V1. However, when black particles 511 of a microcapsule 508 are located near counter electrode layer 552, the respective microcapsule 508 appears black to the viewer V1. The particles 511 and 513 have opposite charges. For example, black particles 511 can be positively charged particles, and white particles 513 can be negatively charged particles, such that when ions (e.g. positive or negative charges) are written to the charge-responsive media layer 534, the respective particles 511, 513 respond according to the respective attractive or repelling forces. Various shades of gray can be created by varying the arrangement of alternating microcapsules with white and black particles located near counter electrode layer 552 to produce halftoning.

With this in mind, as further shown in FIG. 11, an imager unit 510 comprises an erasing head 512 and a writing head 514. In some examples, the respective heads 512, 514 may comprise an ion-based technology, which generates charges from a corona and emits the charges, via an individually addressable electrode array, in a selectable pattern toward the charge receiving layer 530. In some examples, other energy sources may be used to generate the ions, e.g. positive and/or negative charges.

The imager unit 510 and e-paper assembly 500 are arranged for relative movement to each other. For instance, the e-paper assembly 500 may be movable relative to a fixed imager unit 510 or the imager unit 510 may be movable relative to an e-paper assembly 500 in a temporarily fixed position. The imager unit 510 is spaced apart from the external surface 531B of charge responsive layer 530, such that charges emitted from imager unit 510 travel airborne to first side 531B of charge responsive layer 530. In the particular example shown in FIG. 11, the imager unit 510 is shown moving in direction A (when e-paper assembly 500 is fixed) or the e-paper assembly 500 media is shown moving in direction B (when imager unit 510 is fixed). During such relative movement, in some examples the erasing head 512 emits a plurality 518 of negative charges 519 onto charge receiving layer 530 to erase any prior image held by the media layer 534. Then the writing head (W) 514 emits a plurality 516 of positive charges 517 in a selectable pattern (e.g. via an addressable electrode array) onto charge-receiving layer 530. In general, a sufficient number of the charges 517 migrate through the charge-receiving layer 530 such that the charges affect the distribution of the black and white particles 511, 513 within microcapsules 508 at selected positions of an array of microcapsules. In the example shown, because the black particles 511 are positively charged, they are repelled away from the positive charges applied at charge receiving layer 530 while the white particles 513 (which are negatively charged) are attracted to the positive charges applied to the charge receiving layer 530. As a result, the black particles 511 in the selected microcapsules 508 form an image viewable from side 525B, as represented by the directional arrow V1.

In some examples, as represented by the directional arrow V2, the surface 531B at the charge receiving layer 530 may comprise the viewing surface/side of the e-paper assembly 500. Accordingly, in such examples, the charge receiving layer 530 comprises both the imaging side of the e-paper assembly 500 and the viewing side of the e-paper assembly 500.

In some examples, the black particles 511 can be negatively charged particles, and white particles 513 can be positively charged particles. In some such examples, the polarity of the respective erasing and writing heads 512, 514 of the imaging unit 510 may be reversed.

Microcapsules 508 exhibit image stability using chemical adhesion between particles and/or between the particles and the microcapsule surface. For example, microcapsules 508 can hold text and images indefinitely without using electricity, while allowing the text or images to be changed later.

In some examples, the diameter of each microcapsule 508 is substantially constant within layer 534 and can be in one example between 20 µm and 100 µm, such as 50 µm. In some examples, at least a portion of counter electrode layer 552 can be composed of a transparent conductive material, such as indium tin oxide, or an opaque material.

E-paper assembly 500 may have a variety of other configurations. In some examples, each microcapsule 508 may include black particles suspended in a white colored fluid. The black particles can be positively charged particles or negatively charged particles. One or more microcapsules form a pixel of black and white images displayed on e-paper assembly 500. The black and white images are created by placing black particles near or away from counter electrode layer 552 (when surface 555 is the viewing side—V1) or from charge receiving layer 530 (when surface 531B is the viewing side—V2). For example, microcapsules 508 having black particles 511 located away from counter electrode layer 552 reflect white light, corresponding to a white portion of an image displayed on e-paper assembly 500 as viewable on a first viewing side V1. In contrast, the microcapsules with black particles located near counter electrode layer 552 appear black to a viewer V1 corresponding to a black portion of the image displayed on e-paper display 500. Various shades of gray can be created by using halftoning with black particles located near or away from counter electrode layer 552.

In some examples, e-paper assembly 500 may sometimes be referred to as being battery-free or power-free, at least to the extent that e-paper assembly 500 has no on-board power supply, battery, etc. and does not receive power during the erasing and/or writing of images on e-paper assembly 500. In some examples, e-paper assembly 500 may sometimes be referred to as being circuitry-free and/or signal-free, at least because the e-paper assembly 500 omits conductive traces, pathways to conduct signals for erasing and/or writing images on e-paper assembly 500, such as via an applied field between a pair of electrode plates. In some examples, the e-paper assembly 500 may sometimes be referred to as being backplane-free, at least because the e-paper assembly 500 omits a backplane. Similarly, in some examples the e-paper assembly 500 may be sometimes be referred to as being antenna-free, at least because the e-paper assembly 500 omits an antenna in at least some examples. Similarly, in some examples the e-paper assembly 500 may be sometimes be referred to as being receiver-free and/or transceiver-free, at least because the e-paper assembly 500 omits a receiver and/or transceiver in at least some examples. In some examples, the e-paper assembly 500 may sometimes be referred to as being processor-free at least because the e-paper assembly 500 omits a processor.

In at least some examples, the term "passive" in at least the phrase "passive e-paper display portion" may correspond to at least one of the above-identified properties of being battery-free, power-free, circuitry-free, signal-free, backplane-free, antenna-free, receiver-free, transceiver-free, processor-free, etc.

Figure 12:
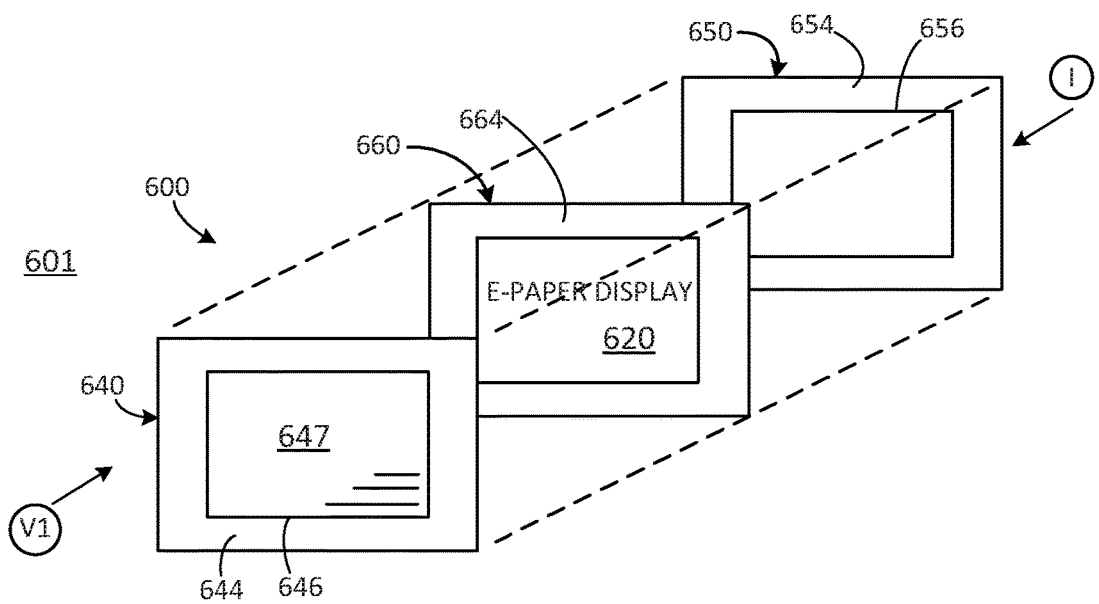
FIG. 12 is diagram including an isometric exploded view schematically representing an example passive e-paper display device.

FIG. 12 is a diagram 601 including an exploded view schematically representing an example a passive e-paper display device 600. As shown in FIG. 12, in some examples display device 600 may comprise support members 640, 650, 660 which are formed about and/or secured relative to an e-paper display 620 (e.g. e-paper assembly 500 in FIG. 11). In one aspect, such arrangements may facilitate the passive e-paper display 620 to function as a gift card, employee badge, access card, display card, transaction medium, etc. In some examples, one support member 660 comprises a frame 664 formed about and/or on the edges of the passive e-paper display 620. In some examples, support member 660 may be further sandwiched between a first outer support member 640 and a second outer support member 650, as shown in FIG. 12. The first outer support member 640 comprises a frame 644 defining a window 646 holding a transparent member 647 through which the passive e-paper display 620 is visible and viewable as represented via indicator V1. The second outer support member 650 comprises a frame 654 defining a window 656 through which a charge receiving layer 530 of the passive e-paper display 620 will be accessible for imaging via imager unit 510 in FIG. 9, as represented via indicator I.

Upon securing the respective support members 640, 660, 650 relative to each other, a single e-paper display device 600 provides a relatively thin, flexible e-paper display media which may enable robust use and handling in a wide variety of conditions while retaining high quality images on e-paper display 620. The e-paper display device 600 is configured to cooperate with an imager unit 510 in FIG. 11 while still being usable and handled like any common gift card, identification card, employee badge, access card, transaction medium, etc. As such, the e-paper display device 600 is highly flexible, thin, light and resistant to wear, impact, etc.

Figure 13A:
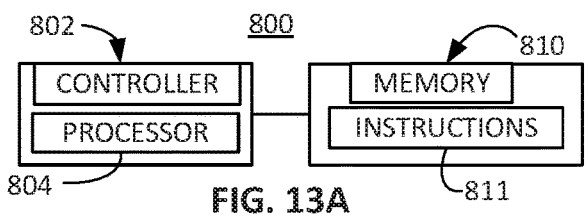
FIGS. 13A and 13B are a block diagram schematically representing an example control portion and an example user interface, respectively.

FIG. 13A is a block diagram schematically representing an example control portion 800. In some examples, control portion 800 provides one example implementation a control portion forming a part of, implementing, and/or managing the imaging unit 510 in FIG. 11, as well as the user interface, instructions, engines, functions, parameters, and/or methods, as described throughout examples of the present disclosure in association with FIGS. 1A-12 and 14-16.

In some examples, control portion 800 includes a controller 802 and a memory 810. In general terms, controller 802 of control portion 800 comprises at least one processor 804 and associated memories. The controller 802 is electrically couplable to, and in communication with, memory 810 to generate control signals to direct operation of at least some the devices, imaging units, readers, user interfaces, instructions, engines, functions, parameters, and/or methods, as described throughout examples of the present disclosure. In some examples, these generated control signals include, but are not limited to, employing instructions 811 stored in memory 810 to at least direct and manage imaging at least a second pattern element and/or other imagery (FIG. 2) in the manner described in at least some examples of the present disclosure. In some examples, at least some instructions 811 are implemented via imaging control engine 1000 in FIG. 14.

In response to or based upon commands received via a user interface (e.g. user interface 820 in FIG. 13B) and/or via machine readable instructions, controller 802 generates control signals to selectively write at least a second pattern element on a passive e-paper display portion in accordance with at least some of the examples of the present disclosure. In some examples, controller 802 is embodied in a general purpose computing device while in some examples, controller 802 is incorporated into or associated with at least some of the devices, imaging units, readers, user interfaces, instructions, engines, functions, parameters, and/or methods, etc. as described throughout examples of the present disclosure.

For purposes of this application, in reference to the controller 802, the term "processor" shall mean a presently developed or future developed processor (or processing resources) that executes sequences of machine readable instructions contained in a memory. In some examples, execution of the sequences of machine readable instructions, such as those provided via memory 810 of control portion 800 cause the processor to perform actions, such as operating controller 802 to implement selective writing of at least a second pattern element on a passive e-paper display portion as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 810. In some examples, memory 810 comprises a computer readable tangible medium providing non-volatile storage of the machine readable instructions executable by a process of controller 802. In other examples, hard wired circuitry may be used in place of or in combination with machine readable instructions to implement the functions described. For example, controller 802 may be embodied as part of at least one application-specific integrated circuit (ASIC). In at least some examples, the controller 802 is not limited to any specific combination of hardware circuitry and machine readable instructions, nor limited to any particular source for the machine readable instructions executed by the controller 802.

In some examples, control portion 800 may be entirely implemented within or by a stand-alone device.

In some examples, the control portion 800 may be partially implemented in the imaging unit 510 and partially implemented in a computing resource separate from, and independent of, the imaging unit 510 but in communication with the imaging unit 510. For instance, in some examples control portion 800 may be implemented via a server accessible via the cloud and/or other network pathways. In some examples, the control portion 800 may be distributed or apportioned among multiple devices or resources such as among a server, an imager, and/or a user interface.

Figure 13B:
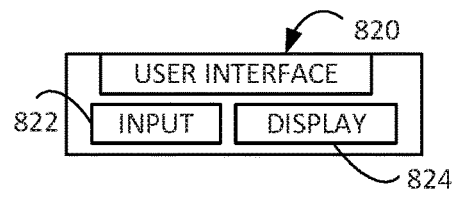

In some examples, control portion 800 includes, and/or is in communication with, a user interface 820 as shown in FIG. 13B. In some examples, user interface 820 comprises a user interface or other display that provides for the simultaneous display, activation, and/or operation of at least some of the devices, imaging units, readers, user interfaces, instructions, engines, functions, parameters, and/or methods, etc. as described in association with FIGS. 1-13A and 14-16. In some examples, at least some portions or aspects of the user interface 820 are provided via a graphical user interface (GUI), and may comprise a display 824 and input 822.

Figure 14:
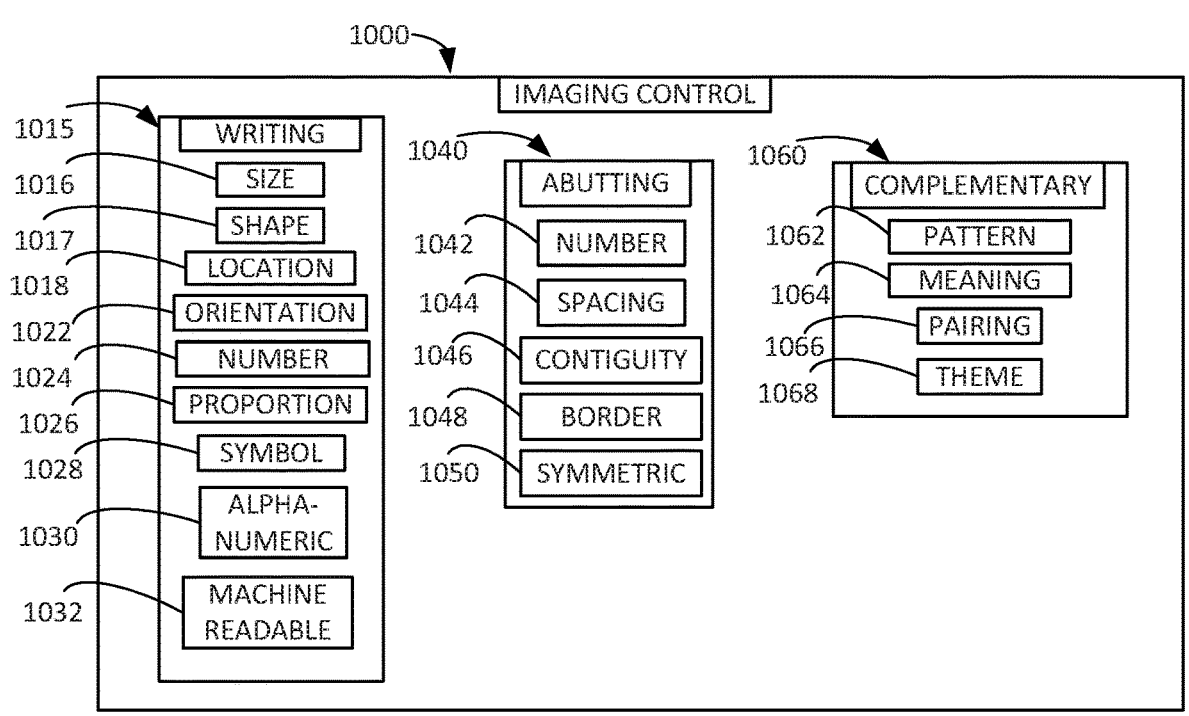
FIG. 14 is a block diagram schematically representing an imaging control engine.

FIG. 14 is a block diagram schematically representing an example imaging control engine 1000. In some examples, the imaging control engine 1000 directs and at least partially controls selective writing of at least a second pattern element on a passive e-paper display portion, as well as performing related tasks. In some examples, imaging control engine 1000 provides at least some example implementations of instructions 811 in memory 810 associated with control portion 800 (FIG. 13A).

In some examples, imaging control engine 1000 provides one example by which at least some examples described in association with at least FIGS. 1-13B and 15-16 may be implemented.

As shown in FIG. 14, in some examples imaging control engine 1000 comprises writing engine 1015, abutting engine 1040, complementary engine 1060, and access code engine 1070.

In general terms, imaging control engine 1000 provides control over imaging a passive e-paper display portion, such as but not limited to, imaging a second pattern element according to at least some examples of the present disclosure as described in association with at least FIGS. 1-13B and 15-16.

In some examples, writing engine 1015 provides control over selective writing a second pattern element in the examples of the present disclosure as previously described in association with at least FIGS. 1-13B and 15. In some examples, writing engine 1015 may comprise a size parameter 1016, shape parameter 1017, location parameter 1018, and orientation parameter 1022 which may correspond to and/or provide control over at least a size, shape, location, and/or orientation of a second pattern element, as previously described in association with at least FIGS. 1-13B and 15-16. In some such examples, these parameters 1016, 1017, 1018, 1022 also may affect other parameters such as a number of, and/or spacing between, adjacent second pattern elements.

In some examples, writing engine 1015 may comprise a number parameter 1024, which may correspond to and/or provide control over the number of second pattern elements in a passive e-paper display portion.

In some examples, writing engine 1015 may comprise a proportion parameter 1026, which may correspond to and/or provide control over a proportion that a second pattern element(s) occupies within in a passive e-paper display portion 60. For instance, in some examples a second pattern element may occupy an entire imagable area of a passive e-paper display portion. However, in some examples, one may select that a second pattern element occupy just a proportion (e.g. 5%, 10%, etc.) of an entire imagable area of a passive e-paper display portion, such as shown throughout various FIGS. of the present disclosure. Accordingly, via the proportion parameter 1026, a second pattern element may be written which defines an area, size, and/or shape which is less than, and which does not correspond to, an area, size, and/or shape of the inner edge of the non-imagable support frame (e.g. border 63 in FIG. 1). In some such examples, the second pattern element may sometimes be referred to as being independent of a size and/or shape of the inner edge of the non-imagable support frame 64.

In some examples, writing engine 1015 may comprise a symbol parameter 1028, which may correspond to and/or provide control over which logos or symbols act as second pattern elements in a passive e-paper display portion 60. In some examples, writing engine 1015 may comprise an alphanumeric parameter 1030, which may correspond to and/or provide control over the use of alphanumeric characters as second pattern element(s), such as previously described in association with at least FIGS. 8A-8D, FIGS. 1-2, FIGS. 5(A)-5(D), etc.

In some examples, writing engine 1015 may comprise a machine readable parameter 1032, which may correspond to and/or provide control over the use of machine readable code as second pattern element(s), such as previously described in association with at least FIGS. 2 and 7.

In general terms, abutting engine 1040 provides at least partial control over the selective writing of second pattern element(s). In some examples, abutting engine 1040 may cooperate with, and/or be at least partially implemented via, at least writing engine 1015 and/or complementary engine 1060. In some examples, abutting engine 1040 comprises number parameter 1042, spacing parameter 1044, contiguity parameter 1046, border parameter 1048, and symmetric parameter 1050. The number parameter 1042 may control selection of the number of different portions of a second pattern element which will abut correspondingly different portions of a first pattern element and the spacing parameter 1044 may control selection of spacing between different portions of a second pattern element (which abut correspondingly different portions of a first pattern element). The contiguity parameter 1046 may control an extent to which at least some portions of second pattern element form a contiguous structure, at the border (parameter 1048) of a support frame and the passive e-paper display portion, with at least some portions of a first pattern element.

The symmetry parameter 1050 may control an extent to which at least some portions of second pattern element exhibit symmetry, about the border (parameter 1048) of a support frame and the passive e-paper display portion, relative to at least some portions of a first pattern element.

In some examples, a complementary engine 1060 may at least partially control an extent to which at least a portion of a second pattern element exhibits a complementary relation relative to at least a portion of a first pattern element. In some examples, the complementary engine 1060 may comprise a pattern parameter 1062 by which a second pattern element (e.g. 54 in FIG. 1) has a complementary meaning relative to the first pattern element based on the particular size, shape, location, abutment, etc. of the second pattern element such that a combination of the first and second pattern elements comprise a complete form (e.g. logos, symbol, etc.). For instance, the second pattern element 362B (in the passive e-paper display portion 60 of display device 350 in FIG. 7) forms a portion of a whole machine readable code, which acts in a complementary manner relative to the portion of the whole machine readable code provided by first pattern element 362A (on non-imagable support frame 64). Stated differently, in some examples the addition of the second pattern element 362B to the first pattern element 364B results in completion or formation of recognizable symbol, code etc. which is recognizable by a human, machine readable, etc.

In some examples, the complementary parameter 1060 comprises a complementary meaning parameter 1064. In some examples, the implementation of the complementary pattern parameter 1062 (e.g. the second pattern element forms a whole pattern when added to a first pattern element) implements a second pattern element having a complementary meaning relative to a first pattern element.

However, in some examples, a second pattern element (selectively writable on the passive e-paper display portion) may have a pattern or form which does not complement or complete the pattern or form of the first pattern element (on the non-imagable support frame). Nevertheless, in some such examples, the second pattern element may complete a meaning of the first pattern element. For instance, the first pattern element may comprise a first word in a term or phrase while the second pattern element may comprise a second word(s) in the term or phrase, such that the second pattern element completes the term or phrase, thereby rendering the first pattern element meaningful relative to the second pattern element or enhancing the meaning of the first pattern element. For instance, the first pattern element may comprise a word, such as PEANUT while the second pattern element may comprise any number of different words, such as SHELL (for the phrase PEANUT SHELL), such as BUTTER (for the phrase PEANUT BUTTER, such as OIL (for the phrase PEANUT OIL), etc. In each instance, the second pattern element provides for a complete term or phrase.

In some examples, the complementary engine 1060 comprises a pairing parameter 1066 by which the second pattern provides a complementary meaning upon combination of the first pattern element and the second pattern element. For instance, in the arrangement shown in at least FIG. 5, each second pattern element (e.g. 222, 224, 226, 228) has a complementary meaning when paired with each respective first pattern element (e.g. 212, 214, 216, 218). For instance, the pairing of a canoe (e.g. second pattern element 228 in frame A) with water (e.g. first pattern element 218 in frame A) provides for a complementary relationship.

In some examples, the arrangement in at least FIG. 5 also schematically represents a theme parameter 1068 of the complementary engine 1060, such as each of the various first and second pattern elements (212, 214, 216, 218, 228, 222, 224, 226, 228) all being part of a single theme, such as outdoor recreation.

With respect to at least the various engines and functions (and their respective parameters) represented within FIG. 14, it will be understood that in at least some examples the various engines, functions, parameters, etc. may be arranged differently (e.g. in different groupings, combinations, separated, etc.) than shown in imaging control engine 1000 of FIG. 14 while still implementing the actions, arrangements, features, attributes, etc. as previously described in association with at least FIG. 14 and/or as described throughout at least some of the examples of the present disclosure.

Figure 15:
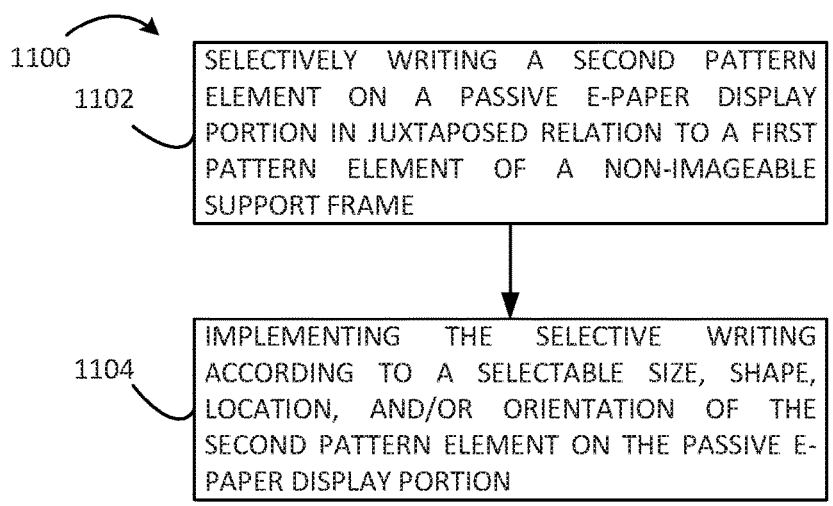
FIG. 15 is a flow diagram schematically representing an example method.

FIG. 15 is a flow diagram schematically representing an example method. In some examples, method 1100 may be performed via at least some of the imaging units (e.g. 510 in FIG. 11), display devices, control portion, user interface, engines, parameters, functions, as previously described in association with at least FIGS. 1-14. In some examples, method 1100 may be performed via at least some imaging units (e.g. 510 in FIG. 11), display devices, control portion, user interface, engines, parameters, functions other than those previously described in association with at least FIGS. 1-14.

As shown in FIG. 15, in some examples at 1102 method 1100 comprises selectively writing a second pattern element on a passive e-paper display portion in juxtaposed relation to a first pattern element of a non-imagable support frame. In some examples, at 1104 method 1100 comprises implementing the selective writing according to a selectable size, shape, location, and/or orientation of the second pattern element on the passive e-paper display portion.

Figure 16:
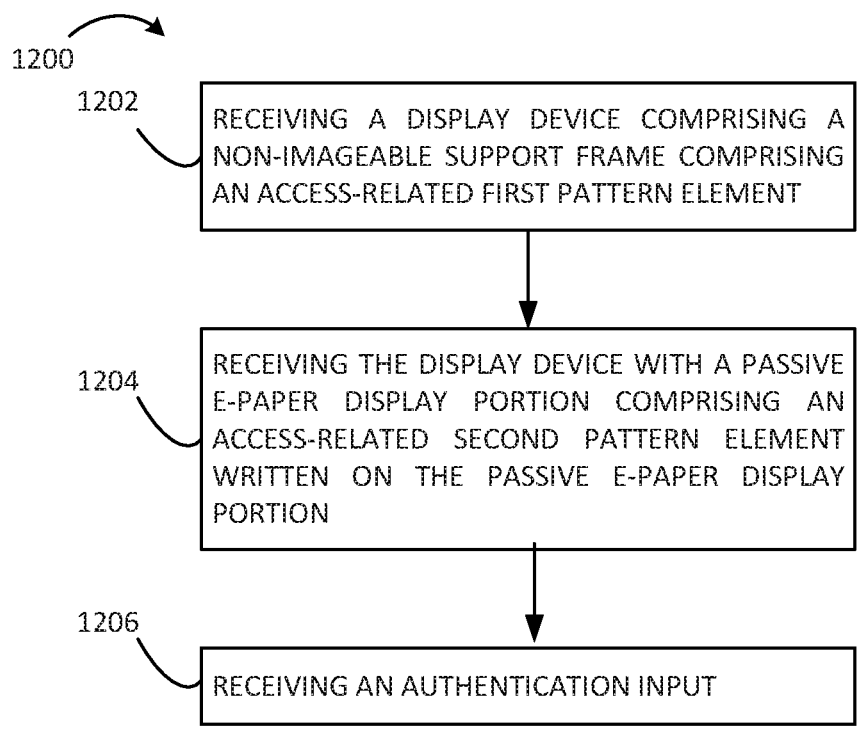
FIG. 16 is a flow diagram schematically representing an example method.

FIG. 16 is a flow diagram schematically representing an example method 1200, which may be used in a security context in some examples. In some examples, method 1200 may be performed via at least some of the imaging units (e.g. 510 in FIG. 11), display devices, control portion, user interface, engines, parameters, functions, methods, etc. as previously described in association with at least FIGS. 1-15. In some examples, method 1100 may be performed via at least some imaging units (e.g. 510 in FIG. 11), display devices, control portion, user interface, engines, parameters, functions, methods, etc. other than those previously described in association with at least FIGS. 1-15.

As shown at 1202, method 1200 comprises receiving a display device comprising a non-imagable support frame comprising a first pattern element, which in turn, may comprise security-related information, such as a photo, name, and/or other personal identifier. At 1204, method 1200 comprises receiving the same display device with a passive e-paper display portion comprising a second pattern element written on the passive e-paper display portion and the second pattern element comprising a dynamic security feature, such as an access token (e.g. today's password, alphanumeric code, etc.), whether human readable and/or machine readable. Accordingly, upon a user presenting the display device to a clerk, guard, or other individual, a reader may receive the display device and then read (e.g. optically scan, etc.) the first pattern element and/or the individual may look at the first pattern element. At the same time, the individual and/or reader also may determine the presence (or absence) of the dynamic second pattern element and whether it meets the criteria for acceptance. Finally, as shown at 1206 in FIG. 16, method 1200 comprises receiving an authentication input (e.g. a PIN), which was previously known to the user and which may be confirmed via the reader and/or individual evaluating the display device. Via this arrangement, at least three different pieces of information provide access control with at least one of the pieces of information being a dynamic second pattern element written on a passive e-paper display portion of a display device according to at least some examples of the present disclosure.

Figure 17:
FIG. 17 is a block diagram schematically representing an arrangement comprising an example reader and an access engine.

FIG. 17 is a block diagram 1251 schematically representing an arrangement comprising an example reader 1250 and an access engine 1260. In some examples, the reader is used to at least partially implement the previously described method 1200 (FIG. 16) and may be in communication with, and/or at least partially incorporate, control portion 800 (FIG. 13A) and/or user interface 820 (FIG. 13B). In some examples, access engine 1260 may be stored as instructions 811 in memory 810 of control portion 800 and at least partially implement the method 1200 in FIG. 16. In some examples, reader 1250 may be incorporated into imaging unit 510 and/or operate in association with an imaging unit (e.g. 510 in FIG. 11). However, in some examples, reader 1250 may be physically separate from and/or operate independently from an imaging unit (e.g. 510 in FIG. 11).

While reader 1250 and access engine 1260 have been described in association with method 1200, it will be understood that reader 1250 and access engine 1260 may be implemented and/or used in association with at least some aspects of the various examples described throughout the present disclosure in association with FIGS. 1-15.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An imaging device comprising:
an erasing unit to erase a passive e-paper display portion of a display device;
a writing unit spaced apart from the passive e-paper display portion to write, via airborne charges, a second pattern element on the passive e-paper display portion to be juxtaposed relative to a first pattern element on a non-imagable support frame surrounding the passive e-paper display portion, wherein the first pattern element comprises a plurality of different first pattern elements arranged along a border of the non-imagable support frame and of the e-paper display portion, and wherein each different first pattern element comprises a different shape with each different shape conveying at least one different item of information; and
a controller comprising:
a processor; and
a non-transitory memory to store instructions, executable via the processor, to cause writing, by the writing unit, of the second pattern element from the memory in the juxtaposed position according to a selectable size, shape, location, and orientation on the passive e-paper display portion,
wherein the juxtaposed position includes selective juxtaposition of the second pattern element in a one-to-one correspondence relative to a respective one of the different first pattern elements, and
wherein the writing includes selective writing of, for each different shape of the respective different first pattern elements, a corresponding different second pattern element which has a shape with a complementary meaning relative to respectively different shapes of respective different first pattern elements.

2. An imaging device comprising:
an erasing unit to erase a passive e-paper display portion of a display device;
a writing unit to write, via airborne charges, a second pattern element on the passive e-paper display portion to be juxtaposed relative to a first pattern element on a non-imagable support frame surrounding the passive e-paper display portion; and a controller comprising:
a processor; and
a non-transitory memory to store instructions, executable via the processor, to cause selective writing of the second pattern element in the juxtaposed position according to a selectable size, shape, location, and orientation on the passive e-paper display portion,
wherein the instructions are to cause selective writing of at least a portion of the second pattern element within the passive e-paper display portion to abut at least a portion of the first pattern element at a border of the non-imagable support frame and the e-paper display portion.

3. The display device of claim 2, wherein the first pattern element comprises a plurality of separate first portions and wherein the instructions are to cause selective writing of the second pattern element as a plurality of separate second portions each of which abut the respective separate first portions.

4. The imaging device of claim 2, wherein the first pattern element comprises a first portion of a machine readable code and wherein the instructions are to cause selective writing of the second pattern element in the passive e-paper display portion as a complementary second portion of the machine readable code such that a combination of the first and second pattern elements forms a complete machine readable code.

5. The imaging device of claim 2, wherein the first pattern comprises a first portion of a shape and wherein the instructions are to cause selective writing of the second pattern element as a complementary second portion of the shape such that a combination of the first and second pattern elements forms a complete shape.

6. The imaging device of claim 5, wherein the shape comprises a complex shape having multiple points of abutting contiguity between first pattern element and second pattern element, with such multiple points spaced apart along the border.

7. The imaging device of claim 2, wherein the first pattern element abuts the border and comprises a first portion, and wherein the instructions are to cause selective writing of a second portion of a plurality of different second portions in which each respective different second portion is in complementary relation to the first portion and in which a combination of the first portion with each respective different second portion is to produce a different completed alphanumeric character.

8. An imaging device, comprising:
an erasing unit to erase two separate passive e-paper display portions of a display device;
a writing unit spaced apart from the respective passive e-paper display portions to write, via airborne charges, a separate second pattern element on each of the two separate passive e-paper display portions to be juxtaposed relative to a first pattern element on a portion of a non-imagable support frame extending between the two separate passive e-paper display portions with other portions of the support frame surrounding each separate passive e-paper display portion; and
a controller comprising:
a processor; and
a non-transitory memory to store instructions, executable via the processor, to cause writing, by the writing unit, of the second pattern element from the memory in the juxtaposed position according to a selectable size, shape, location, and orientation on the passive e-paper display portion, wherein the instructions are to write the two separate second pattern elements on opposite sides of the first pattern element sandwiched between the two separate passive e-paper display portions.

9. A display device comprising:
a non e-paper portion to display a first pattern element; and
a passive e-paper display portion surrounded by the non-e-paper portion to display an externally written second pattern element juxtaposed relative to the first pattern element, wherein the non e-paper portion defines an aperture through which the passive e-paper display portion is viewable, and wherein the aperture defines a border between the non e-paper portion and the passive e-paper display portion at which at least a portion of the second pattern element is to abut the at least a portion of the first pattern element.

10. A control portion of an imaging device comprising:
a processor; and
a non-transitory memory to store instructions, executable via the processor, to cause selective writing of a second pattern element on a passive e-paper display portion of a display device by a writing unit spaced apart from, and emitting airborne charges onto, the passive e-paper display portion, the second pattern element in juxtaposed relation to a first pattern element on a non-imagable support frame surrounding the passive e-paper display portion, wherein the selective writing comprises implementing the juxtaposed relation according to a selectable size, shape, location, and orientation of the second pattern element on the passive e-paper display portion,
wherein the instructions are to cause selective writing of at least a portion of the second pattern element within the passive e-paper display portion to abut at least a portion of the first pattern element at the border of the non-imagable support frame and the e-paper display portion.

* * * * *